Jan. 16, 1940. S. H. DOUGLASS 2,187,196
LUNCH BOX
Filed July 12, 1938
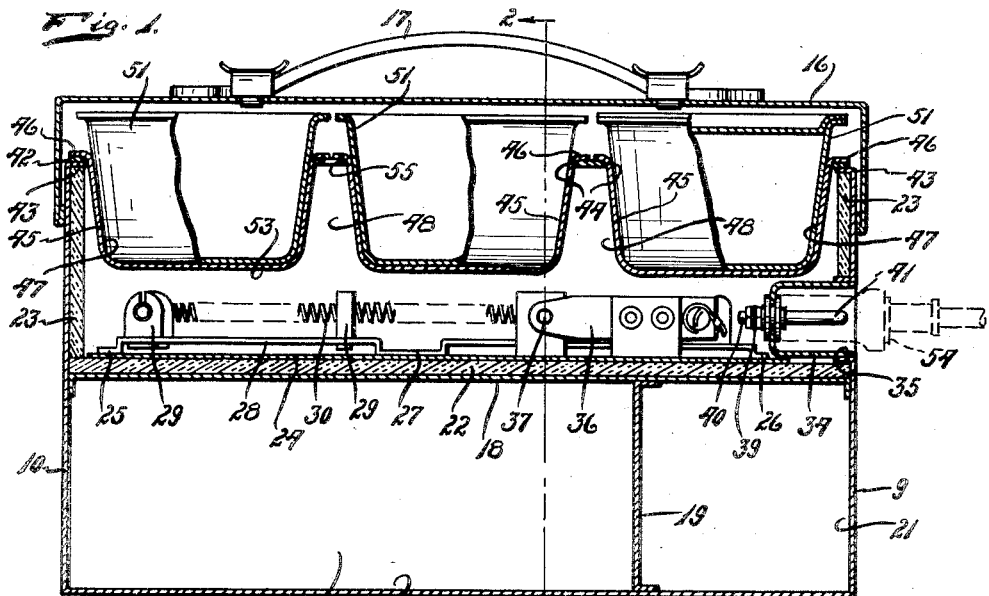
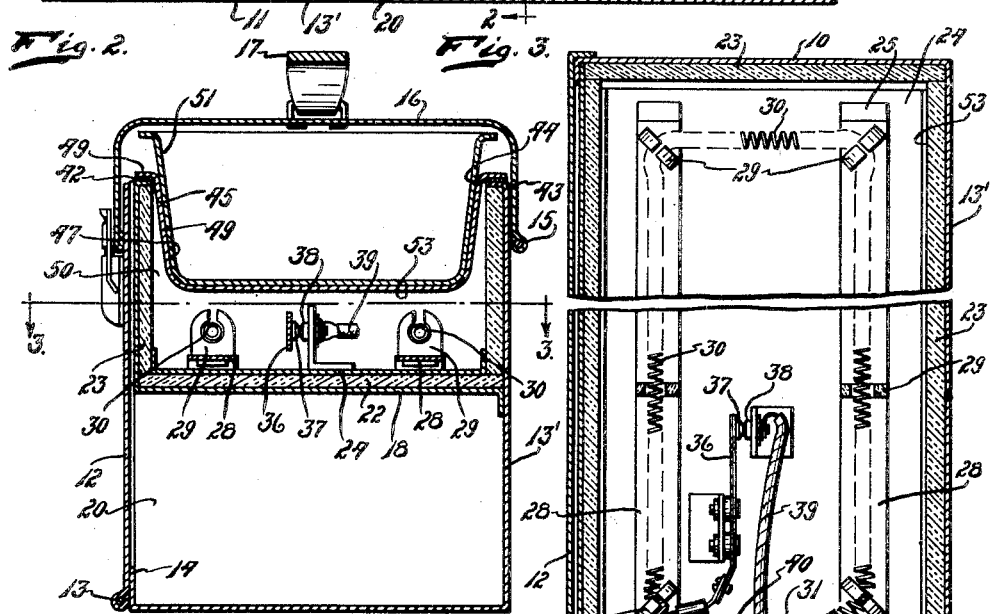
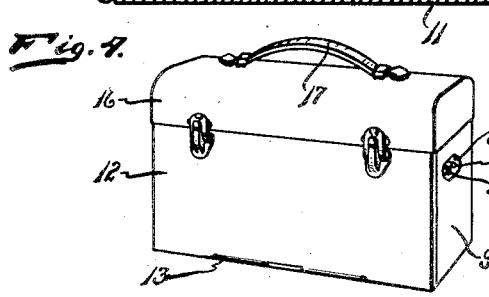
INVENTOR.
SAMUEL H. DOUGLASS
BY Thos. L. Donnelly
ATTORNEY.

upper and a lower compartment; means for insulating said compartments from each other; a cover for said upper compartment having a plurality of spaced openings formed therein adapted for the reception of food containers insertible therein, said openings being spaced from each other and from the walls of said compartment; an electric heating element positioned in said upper compartment for heating the food in the receptacles positioned in said openings, and means projecting through one wall of said upper compartment adapted for electrical connections.

8. A lunch box of the class described, comprising: a box-like structure; a horizontally disposed partition dividing said structure into an upper and a lower compartment; means for insulating said compartments from each other; a cover for said upper compartment having a plurality of spaced openings formed therein adapted for the reception of food containers insertible therein, said openings being spaced from each other and from the walls of said compartment; an electric heating element positioned in said upper compartment for heating the food in the receptacles positioned in said openings; means projecting through one wall of said upper compartment adapted for electrical connections; and means associated with said heating element for breaking the circuit thereto upon the development of a predetermined temperature in said upper compartment.

9. A lunch box comprising: a box-like structure; a horizontally disposed partition in said structure for dividing the same into an upper compartment and a lower compartment; means for insulating said compartments from each other; an electric heating element mounted in said upper compartment; means projecting through one wall of said upper compartment adapted for electrical connections, said means being connected to said heating element; means associated with said heating element for breaking the circuit thereto upon the development of a predetermined temperature in said upper compartment; a cover for said upper compartment having a plurality of spaced openings formed therein; and a receptacle insertible into each of said openings for the reception of food to be heated.

10. A lunch box comprising: a box-like structure; a partition separating said structure into a pair of non-communicating compartments; means for insulating said compartments from each other; an electric heating element in one of said compartments; means projecting through one of the walls of said last-named compartment for electrical connections; and a plurality of spaced food receptacles projectible inwardly of one of the walls of said last-named compartment, said receptacles being in spaced relation to said heating element and in spaced relation to each other.

SAMUEL H. DOUGLASS.

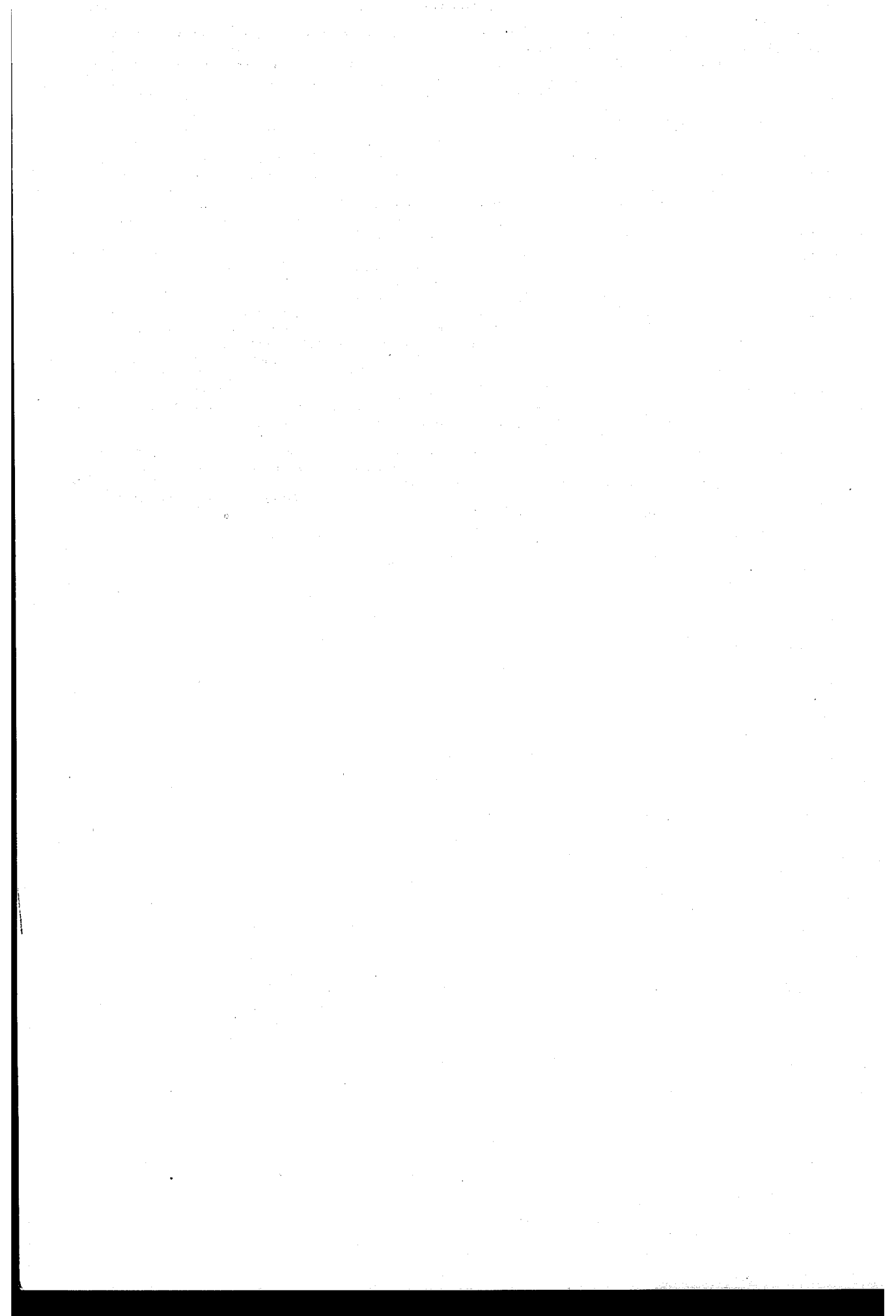

Patented Jan. 16, 1940

2,187,196

UNITED STATES PATENT OFFICE 2,187,196

LUNCH BOX

Samuel H. Douglass, Detroit, Mich.

Application July 12, 1938, Serial No. 218,833

10 Claims. (Cl. 219—19)

My invention relates to a new and useful improvement in a lunch box so constructed and arranged that a part of the contents of the lunch box may be heated thus providing a lunch box whereby the user may carry with him different kinds of food which are ordinarily served hot and have present a means for heating the same prior to their use.

Another object of the invention is the provision of a lunch box of this class having an electric heating unit incorporated therein so constructed and arranged as to occupy a minimum amount of space and of a maximum efficiency.

Another object of the invention is the provision in a lunch box of this class of an electric heating element so constructed and arranged that the circuit therethrough may ordinarily be broken upon the rising of the same to a predetermined temperature of heat.

Another object of the invention is the provision of a lunch box of this class which will be simple in structure, economical of manufacture, light, compact, durable and highly efficient in use.

Other objects will appear hereinafter.

The invention consists in the combination and arrangement of parts hereinafter described and claimed.

The invention will be best understood by a reference to the accompanying drawing which forms a part of this specification, and in which, Fig. 1 is a longitudinal, central, vertical, sectional view of the invention with parts shown in side elevation and parts broken away.

Fig. 2 is a sectional view taken on line 2—2 of Fig. 1 with a part broken away.

Fig. 3 is a sectional view taken on line 3—3 of Fig. 1 with a part broken away.

Fig. 4 is a perspective view of the invention.

As shown in the drawing the lunch box embodies a bottom section of box-like structure and an upper section which serves as a cover or lid for the box-like structure. This lower section embodies the end walls 9 and 10, a bottom 11, and a front wall 12 which is hingedly connected at 13 to the flange 14 projecting upwardly from the bottom 11. A rear wall 13 projects upwardly from the bottom 11 and hingedly connected at 15 to the upper edge of this rear wall is a cover 16 which is also formed box-like in structure so as to embrace the upper edge of the lower section of the construction. A suitable handle 17 is carried by this cover or lid 16. Mounted in the lower section in spaced relation to the bottom 11 and substantially medial of the lower section is a horizontally disposed partition 18 against which engages the transverse partition 19 projecting upwardly from the bottom 11, these partitions forming with the bottom chambers or compartments 20 and 21 which are accessible from the front side when the front wall 12 is swung downwardly on its pivot 13.

Overlying the upper surface of the partition 18 is a layer 22 of suitable heat and electrical insulating material formed from asbestos, fiber, or the like. The inner surface of the upper portions of the front and rear walls and the side walls are also covered with a similar layer 23. Resting upon the layer 22 is a metallic plate 24 attached to which at their ends 25 and 26 and at an intermediate point 27, are the supporting strips 28, the major portion of which is in spaced relation to the metallic strip 24. Mounted on and projecting upwardly from these supporting strips are lugs 29 formed from suitable insulating material and through which is threaded a heating element 30, one end of which is connected to a contact 31 carrying the prong 32 which projects through the inner wall 33 of the housing 34 mounted in the opening 35 formed in the end wall 9. The opposite end of the heating element is attached to a contact plate 36 which is a compound bar, one side of which is formed from a metal having a different coefficient of expansion than the other side. This bar carries, on its end, a contact 37 adapted to engage the contact 38 which is attached by the cable 39 to the contact 40 having the prong 41 projecting outwardly of the inner wall 33 of the housing 34. The construction is such that when the prongs 32 and 41 are connected to a source of electrical energy the heating element will serve to heat the space above the plate 24. The contacts 37 and 38 are normally in engagement but should the temperature rise beyond a predetermined degree, the flexing of the compound bar 36 would break the circuit by separating the contacts 37 and 38.

A closure is provided for the space above the partition 18, this closure comprising a plate 42 overlying at its edges the inwardly turned flange 43 on the side and end walls to which it is spot welded or otherwise suitably secured. This plate 42 is provided with openings 44 formed therein and in each of these openings is inserted a trough-like dish or container 45 each of which is provided around its upper edges with a flange 46 which rests upon and is welded or otherwise suitably secured to the plate 42. It is believed obvious that, if desired, these dish-like parts 45 may be formed integral with the plate 42 but they are illustrated as formed from separate pieces